(12) United States Patent
Li (10) Patent No.: US 7,610,164 B1
(45) Date of Patent: Oct. 27, 2009

(54) SYSTEM AND METHOD OF CONSTANT POWER BIASING CIRCUIT

(75) Inventor: Kan Li, Singapore (SG)

(73) Assignee: Marvell International Ltd., Hamilton (BB)

( * ) Notice: Subject to any disclaimer, the term of this patent is extended or adjusted under 35 U.S.C. 154(b) by 0 days.

(21) Appl. No.: 11/875,506

(22) Filed: Oct. 19, 2007

Related U.S. Application Data (60) Provisional application No. 60/863,636, filed on Oct. 31, 2006.

(51) Int. Cl.
   *G01R 35/00* (2006.01)
   *G11B 21/02* (2006.01)
(52) U.S. Cl. .................................... 702/107; 360/75
(58) Field of Classification Search .................. 702/107
   See application file for complete search history.

(56) References Cited

U.S. PATENT DOCUMENTS

| | | | |
|---|---|---|---|
| 6,549,867 B1 * | 4/2003 | Smith | 702/107 |
| 2006/0041402 A1 * | 2/2006 | Baker | 702/189 |
| 2007/0168151 A1 * | 7/2007 | Kernahan et al. | 702/132 |
| 2007/0171563 A1 * | 7/2007 | Pit | 360/75 |
| 2007/0268608 A1 * | 11/2007 | Takahashi | 360/75 |
| 2007/0268615 A1 * | 11/2007 | McFadyen et al. | 360/75 |

* cited by examiner

*Primary Examiner*—Bryan Bui
*Assistant Examiner*—Jonathan Teixeira Moffat (57) ABSTRACT

A system is provided to adjust a separation distance between a read/write sensing head and a data storage medium surface in a hard disk. The thermal expansion of the sensing head based on heat generated by power dissipated through the sensing head is precisely controlled. When electrical resistance is not accurately known, a calibration is performed in which a specific input value is matched to a predetermined reference electrical power. The matching is done through a reference voltage source, that remains at a fixed value, and a calibration factor is successively adjusted through a feedback loop until an optimum value of the calibration factor is obtained. At the conclusion of the calibration process, the feedback loop is disabled and the optimally attained value of the calibration constant is frozen. The electronic circuit to implement the proposed system is based on cost effective CMOS technology.

25 Claims, 3 Drawing Sheets

SYSTEM AND METHOD OF CONSTANT POWER BIASING CIRCUIT

INCORPORATION BY REFERENCE

This application claims benefit of U.S. Provisional Application No. 60/863,636, "Constant Power Biasing Circuit For Fly High Controller," filed on Oct. 31, 2006. The disclosure of the priority application is hereby incorporated herein by reference in its entirety.

BACKGROUND

As electronic systems become more compact, and the tolerances between individual components are required to be maintained to precise specifications, the effects of thermal expansion based on heat generated by, or dissipated through, individual component may modify such clearances in a manner that requires some compensation. Such compensation may be provided, for example, by a programmable electrical power biasing circuit.

Programmable electrical power biasing circuits are used in many and widely varied applications. For example, such circuits may be used in hard disk driver control and operating systems. In such systems, separation distances between a sensing head and a recording medium must often be maintained to the types of strict tolerances discussed briefly above. Often, one or more resistive elements are used as part of the sensing head. These resistive elements are subject to amounts of electrical power being dissipated through them. A resulting change in temperature results in a characteristic thermal expansion which, in turn, affects the separation distance between the sensing head and the recording medium. Through active control of power dissipated through the one or more resistive elements, the thermal expansion may be predictably modified, and, the separation distance between the sensing head and the recording medium may be predictably set, controlled or varied. In other words, by controlling the electrical power dissipation through the one or more resistive elements of the sensing head precise control of the separation distance may be controlled.

The resistive element is often biased such that it dissipates a predetermined amount of electrical power precisely through it resulting in repeatable heat generation and associated thermal expansion. In order to precisely set an electrical power dissipation, an electrical power calibration routine is generally performed during, in conjunction with, or at some point subsequent to, a power-up cycle of the system within which the resistive element is located. Such calibration attempts to nullify any potential deviation in thermal expansion by adjusting the power to be dissipated through the resistive element according to an adjustment factor. The adjustment factor is arrived at through the calibration routine. While generally only one calibration routine is required, more than one calibration routine may be undertaken sequentially or during predetermined, scheduled, or random breaks at intervals in an operating cycle of the system. When only one calibration routine is undertaken, or a series of calibration routines are initiated, just after the power-up cycle, an adjustment factor is determined and applied to the system such that subsequently during the operating cycle of the system a predetermined amount of electrical power to be dissipated through the resistive element is precisely controlled in order to limit deviations in heat generation and the accompanying thermal expansion through the system.

SUMMARY

One method by which to execute an electrical power calibration routine is to introduce a signal to the system that represents a known reference value for the electrical power to be dissipated through the resistive element. The actual electrical power dissipated through the resistive element is then measured. Because electrical power dissipated through, for example, a resistive element cannot be easily directly measured, other methods are often undertaken to measure the electrical power dissipated through a resistive element. Such methods include computing the electrical power dissipated through the resistive element by multiplying the electrical current through the resistive element by the electrical voltage across resistive element. In such a computing method, a multiplication operation is critical to estimate the electrical power dissipated through the resistive element.

Multiplication operations are commonly carried out at a device level with circuits comprising bipolar transistors. However, multiplication operations are not generally available at a device level in circuits comprising CMOS transistors. This is because the bipolar devices have a junction which has a non-linear response, and the CMOS device does not. Because they dissipate low power and can be arranged to have a very high density, CMOS technology based circuits are extensively used in implementing a wide range of Application Specific Integrated Circuits (ASICS). Adding bipolar transistor components to a CMOS based circuit to simplify implement a multiplication operation may not be a cost effective solution since such an apparatus, making use of BiCMOS technology may be both more complex and therefore detrimentally impact advantages achievable through implementing a circuit with CMOS-only technology if possible.

One technique for precisely adjusting a separation distance between a sensing head and a recording medium in, for example, a disc driver is to predictably control the thermal expansion of the sensing head by controlling heat generated by a resistive element through which power is dissipated in the sensing head. Electrical current through the resistive element dissipates electrical power that raises the temperature of the resistive element. The resulting thermal expansion of the sensing head modifies the separation distance between the sensing head and data recording medium. In order to set the electrical power dissipation through the sensing head precisely, a calibration process may be performed to estimate parameters that determine an actual electrical power dissipated through the resistive element and to precisely control the actual electrical power dissipated to be substantially equivalent to the desired power to be dissipated, i.e., a known amount of power. Such a technique may find particular relevance and design of, for example, a constant electrical power biasing circuit for a fly high controller.

Since the electrical power dissipated through a resistive element is a multiplication of an electrical current through the resistive element and an electrical voltage across the resistive element, biasing a circuit that controls precise electrical power dissipation across the resistive element may advantageously perform a multiplication operation. As was indicated above, although CMOS is a preferred technology to design such commercial circuits, device level multiplication is not conventionally available in a CMOS transistor circuit as in a bipolar transistor.

In view of aforementioned shortfalls, this disclosure is directed to systems and methods for implementing, based on CMOS technology, a circuit that may be used to calibrate a known amount of reference electrical power dissipated through a resistive element by establishing a calibration factor based on known inputs and measuring parameters associated with electrical power for comparison to a reference value.

In various exemplary embodiments, the systems and methods according to this disclosure may provide that, subsequent to a calibration operation, a desired electrical power may be set to be dissipated through the resistive element precisely based on application of the calibration factor. It should be appreciated that the calibration may be done in conjunction with a power-up cycle and may be undertaken just once so that, upon completion of the power-up cycle and calibration, any desired electrical power could be dissipated through the resistive element via a suitable mechanism based on inputting a value representing the desired amount of electrical power to be dissipated through the resistive element adjusted by the calibration factor.

The systems and methods according to this disclosure may implement a constant electrical power biasing circuit for a fly high controller using CMOS technology. The electrical power biasing circuit may provide an occasion for calibration during a power-up cycle to establish a calibration factor for the system in operation, and allow subsequent precise adjustment of electrical power dissipation through a resistive element. The electrical biasing circuit may further provide a mechanism to set a post-calibration desired electrical power dissipation precisely by means of any convenient user interface, and to automatically apply the calibration factor to the received input to achieve the desired power dissipation. Precise control of the power dissipated through, for example, a resistive element in a sensing head of a disc drive read/write mechanism in this manner may allow for precise adjustment of separation distances between the sensing head and a data storage medium.

The systems and methods according to this disclosure may provide a way to dissipate a pre-specified amount of constant electrical power, over a pre-defined range of values with a pre-defined precision, through an electrical power dissipating device that may include but not be limited to a resistive element, utilizing CMOS technology based circuits.

It should be appreciated that the disclosed systems and methods may be implemented using CMOS technology based circuits. It should be further appreciated that the disclosed systems and methods may be used for applications including, but not limited to, modifying a resulting thermal expansion for adjusting a separation distance between a sensing head and a data storage medium in a data storage device.

In various exemplary embodiments, the systems and methods according to this disclosure may input a value, through a suitable user interface, that may represent an amount of an electrical power dissipated through a device. Further, the value, that is input, may have an analog or a digital representation. The systems and methods according to this disclosure may provide a way to achieve an arithmetic multiplication operation implemented in CMOS based circuits, wherein at least one or more of the operands may be represented by analog values, and the output of the multiplication may be represented in an analog or a digital form. Alternatively, the systems and methods according to this disclosure may provide a way to achieve an arithmetic multiplication operation implemented in CMOS based circuits, wherein at least one or more of the operands may be represented by digital values, and the output of the multiplication may be represented in an analog or a digital form.

In various exemplary embodiments, the systems and methods according to this disclosure may convert the input value, representing the amount of the electrical power dissipated through a device, into a calibration current. It should be appreciated that a suitable mechanism converts the input value into the calibration current value by executing an algorithm.

In various exemplary embodiments, the systems and methods according to this disclosure may further determine the value of the electrical current through the electrical power dissipating device to be equal to a value of a calibration current multiplied by a calibration factor. An objective of an electrical power calibration according to this disclosure may be to determine an optimum value of the calibration factor (referred to as an "established value").

In various exemplary embodiments, the systems and methods according to this disclosure may have different operational phases, including but not limited to an electrical power calibration phase and an electrical power dissipation setting phase. In this manner the electrical power calibration phase may be undertaken one or more times after a power-up cycle, and the electrical power dissipation setting phase may be operated, based on sensing one or more different electrical power dissipation settings, subsequent to the calibration phase.

In various exemplary embodiments, the systems and methods according to this disclosure, during a dedicated calibration phase, may be tuned through a corrective mechanism such that for a specific input a predetermined amount of electrical power may be precisely dissipated through a device, that may include but not be limited to a resistive element. Hence, the dedicated calibration phase may set a precise relationship between the input and the electrical power dissipated through the device, such as, for example, by determining an optimum value for a calibration factor. Subsequently, during the electrical power dissipation setting phase, the corrective mechanism may be turned off, and the input may be set to allow a predetermined amount of electrical power to be dissipated through the device, precisely by applying the optimum value of the calibration factor to the input.

In various exemplary embodiments, the systems and methods according to this disclosure may implement a corrective mechanism by means of a feedback loop, in which a calibration factor, during a calibration phase, is successively updated. At the conclusion of the calibration phase, an optimum value of the calibration factor, "established value," may be determined. The optimum value of the calibration factor may establish a relationship between an input value associated with an electrical power to be dissipated, and a known amount of reference electrical power, referred to as the calibrated power, to be dissipated through the device. In this manner, a tolerance in the value of an electrical resistance of the resistive element may be compensated for. The establishing of the established value may conclude the calibration process and may signal the end of the calibration phase.

In various exemplary embodiments, the systems and methods according to this disclosure may disable the feedback loop at the conclusion of the calibration phase so that the established value of the calibration factor may not change until a next power-up cycle, or otherwise, when a new calibration phase may commence. A precise value of an amount of electrical power may be dissipated through the electrical power dissipating device by inputting a value, through a suitable interface, and applying the calibration factor.

These and other objects, advantages and features of disclosed exemplary systems and methods are described in, or apparent from, the following description of embodiments.

BRIEF DESCRIPTION OF THE DRAWINGS

Exemplary embodiments of disclosed systems and methods for constant power biasing of an electrical power dissipating device will be described, in detail, with reference to the following drawings, wherein.

DETAILED DESCRIPTION OF EMBODIMENTS

The following description pertains to various exemplary embodiments of systems and methods for dissipating a predetermined amount of electrical power precisely through an electrical power dissipating device, particularly a system implemented by means of CMOS based ASICS. The systems and methods according to this disclosure may be applied in precisely controlling the thermal expansion based on heating of a resistive element representing a read/write sensing head in a data storage device. Such systems may need to precisely control the thermal expansion resulting from heating of the sensing head based on electrical power dissipated through a resistive element on the sensing head to precisely adjust a separation distance between the sensing head and a data storage medium. It should be appreciated that references to a specific application for the disclosed systems and methods in such systems, and with respect to such media, are made for clarity and ease of understanding and may be further depicted in exemplary manner in FIGS. 1-3. Such references to exemplary embodiments of the systems and methods according to this disclosure, and their applicability to a specific application, are intended to be illustrative and should not be construed as limited to such applications, or to any specific system that may be considered limited by the elements shown in the figures. A scheme to calibrate a known amount of reference electrical power through virtually any electrical power dissipating device, according to the systems and methods of this disclosure, may find applicability in any system in which the electrical power dissipating device may have an electrical voltage across it related to an electrical current through it. A precise resistance value for such a device may not be precisely known.

The systems and methods according to this disclosure provide a capability to achieve an arithmetic multiplication operation implemented in CMOS-based circuits, in which input operands may be applied in a mixed format of analog and/or digital presentation in order that:

(1) at least one or more of the operands may be presented as analog values, and the output of the multiplication may be represented in an analog or a digital form; or (2) at least one or more of the operands may be presented as digital values, and the output of the multiplication may be represented in an analog or a digital form.

The systems and methods according to this disclosure may determine a value of an electrical current through an electrical power dissipating device to be based on the value of the calibration current modified by a calibration factor. It should be appreciated that the value of the electrical current through the electrical power dissipating device determines the electrical power dissipated through the electrical power dissipating device according to the square law $$P_d = I_d^2 * R_d \quad \text{(Equation 1)}$$

wherein $P_d$ is the electrical power dissipated through the device, $I_d$ the electrical current through the electrical power dissipating device and $R_d$ the electrical resistance of the electrical power dissipating device respectively.

The systems and methods according to this disclosure may set a reference value for a known amount of reference electrical power based on a predetermined precise reference electrical voltage source. It should be appreciated that the value of the reference electrical power, which the electrical power dissipating device may employ for calibrating during the calibration phase, may be given as $$P_{ref} = I_{cal} * V_{ref} \quad \text{(Equation 2)}$$

wherein $P_{ref}$ is the reference value of the electrical power to be calibrated, $I_{cal}$ is the value of the calibration electrical current and $V_{ref}$ is the reference value of the electrical voltage respectively.

Figure 1:
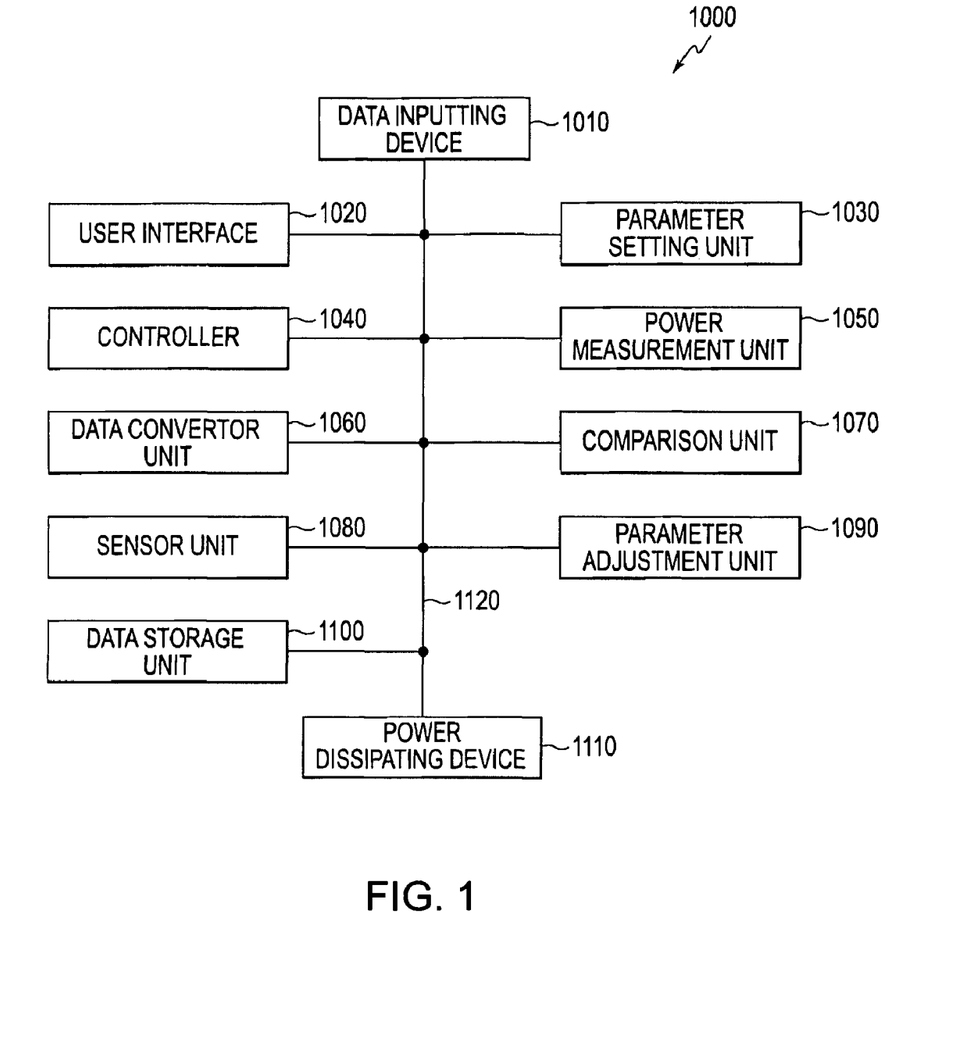
FIG. 1 schematically illustrates a block diagram of an exemplary embodiment of a system for dissipating a predetermined amount of electrical power precisely through an electrical power dissipating device.

FIG. 1 schematically illustrates a block diagram of an exemplary embodiment of a system 1000 for dissipating a predetermined amount of electrical power precisely through an electrical power dissipating device 1110. As will be described in detail below, the system 1000 may include one or more devices for calibrating a known amount of reference electrical power dissipated through the device 1110. As shown in FIG. 1, the system 1000 may include a data inputting device 1010, a user interface 1020, a parameter setting unit 1030, an electrical power measurement unit 1050, a data converter unit 1060, a comparison unit 1070, a sensor unit 1080, a parameter adjustment unit 1090, one or more data storage units 1100, and an electrical power dissipating device 1110, which in a specific application may include one or more resistive elements, all connected via a data/control bus 1120, with operation of each, or combinations, of the devices being controlled by a controller 1040.

Data may be input through a data inputting device 1010. The data input may represent an amount of electrical power that may be dissipated through an electrical power dissipating device 1110. A specific value of data input may represent a known amount of reference electrical power desired to be dissipated through the electrical power dissipating device 1110. A relationship regarding the specific value of data input and a known amount of reference electrical power desired to be dissipated through the electrical power dissipating device 1110 may be determined by resolving a calibration factor (parameter) in a manner as will be described in greater detail below. The data inputting device 1010 may accept data in several possible forms, including but not limited to, an analog presentation or a digital presentation.

A user interface 1020 may be provided in the form of, for example, a graphical user interface associated with the system 1000, in order to receive a user input, representing variable parameters for adjustment of operations within the system 1000. Variable operating parameters may facilitate improved precision with which a predetermined amount of electrical power may be dissipated through the electrical power dissipating device 1110. It should be appreciated that the user interface 1020 may also include, for example, any manner of digital data reading device, and compatible digital data storage medium, or a locally or remotely located computer, or other data workstation, that may be in data communication with the system 1000.

A controller 1040 may be provided to control overall operations of the system 1000, or otherwise to specifically control only sensed characteristics and/or input characteristics regarding a particular configuration of the system 1000, to query databases stored within one or more data storage units 1100, and/or to carry out operations based on determinations made in other units within the system 1000.

It should be appreciated that the controller 1040 may initiate, execute and conclude different operating phases with respect to the system 1000. One such operating phase may be a calibration phase wherein a known amount of reference electrical power, dissipated through the electrical power dissipating device 1110, may be calibrated corresponding to a specific value of data input through the data inputting device 1010. Another operating phase may be an electrical power dissipation setting phase in which a predetermined amount of electrical power may be set to be dissipated through the electrical power dissipating device 1110. This setting may occur by inputting an appropriate input data value through the data inputting device 1010. The appropriate value of data input to initiate dissipation of a predetermined amount of electrical power may be based on a relationship established between the value of the data input and a corresponding amount of the electrical power dissipated through the electrical power dissipating device 1110 during a calibration phase.

The controller 1040 may further organize a plurality of electrical power dissipation setting sequences of events executed at the instance of a user-initiated command or automatically at predetermined time intervals, or governed by occurrences of certain events sensed by a sensor unit 1080. It should be appreciated that each of the electrical power dissipation setting events may be executed with an amount of the electrical power to be dissipated that may be unique to that specific event and may be dependent or independent of the amount of the electrical power to be dissipated corresponding to any other event of the sequence.

A sensor unit 1080 may be provided by which to automatically determine characteristics of either an electrical power dissipation setting system or an environment within which the electrical power dissipation setting system is being operated. An objective of such sensing is to, in an automated manner, provide input for determining whether a new system calibration phase may be warranted in order to support improved precision with which a predetermined amount of electrical power dissipation may be adjusted through an electrical power dissipating device 1110. Any manner of sensor by which, for example, composition of and/or characteristics of an electrical power dissipation setting system may be sensed, or other environmental conditions of the operating environment for the system 1000 or may be sensed, are contemplated.

One or more data storage units 1100 may be provided additionally to store, for example, reference data for a known amount of reference electrical power that may be dissipated for instance, during a calibration operation or during a calibration phase. The one or more data storage units 1100 may additionally be used to store a data manipulation algorithm that may modify a data input to set a predetermined amount of the electrical power to be dissipated during an electrical power dissipation setting phase. It should be appreciated that if a plurality of electrical power dissipation setting events are to be performed in a sequential fashion, the data storage units 1100 may be used to store a plurality of values related to predetermined amounts of electrical power to be sequentially dissipated during the electrical power dissipation setting phase, corresponding to each of the events in the predetermined sequence.

A data converter unit 1060 may be provided to convert the data input via the data inputting device 1010 into a component of electrical power to be dissipated through the electrical power dissipating device 1110. It should be appreciated that the resistive electrical power, that is dissipated through a device, may depend on the electrical current through the device 1110 or the electrical voltage across the device 1110. Each of the electrical current through a device 1110 and the electrical voltage across the device 1110 is a component of electrical power that is to be dissipated through the device 1110.

The electrical power dissipated through a device is mathematically proportional to either the square of the electrical voltage across the device or the square of the electrical current through the device. Data input through the data inputting device 1010 may represent the electrical power that is to be dissipated through the device 1110. The data converter unit 1060 may reference, for example, applying a conversion algorithm to convert a data input to one or more components of an actual electrical power to be dissipated through the device 1110 that may be stored in one or more data storage units 1100. The data converter unit 1060 may recognize the relationship between the data input and the amount of actual electrical power to be dissipated through the device 1110 is nonlinear, governed by the aforementioned square law, if the relationship between the data input and a component of electrical power to be dissipated through the electrical power is linear. For example, if the conversion relationship between a data input and a component of the electrical power to be dissipated, be it the electrical voltage across the device 1110 or the electrical current through the device 1110, were set to be linear, any change in the value of the data input may be reflected as a nonlinear change in a measured dissipated electrical power. Illustrating this example further, if the data input were linearly related to any of the electrical power components, a doubling of the data input may result in quadrupling of the actually dissipated electrical power through the device. The data converter unit 1060 may be organized to maintain a linear relationship between the data input and the resulting electrical power to be dissipated through the device 1110.

The data converter unit 1060 may also recognize the relationship between the data input and a component of the dissipated electrical power may be governed by an equation specific to a particular device 1110. It may be further appreciated that the relationship between the data input and a component of the dissipated electrical power may not be linear. In such an instance, the data converter unit 1060, may need to compensate for a non-linear relationship between the data input and a component of the dissipated electrical power in addition to accounting for the square law relationship between the component of the dissipated electrical power and the electrical power dissipated through the device, in order to maintain a linear relationship between the data input and the resulting electrical power dissipation through the device. The data converter unit may also include circuits, such as CMOS-based circuits, which, in a case where the component of electrical power is current flowing through the power dissipating device 1110, may include a semiconductor current mirror, or in a case where the component of electrical power is voltage across the power dissipating device 1110, may include a voltage gain amplifier.

It should be appreciated that the tasks of the data converter unit 1060 may be implemented via an algorithm that converts the data input, obtained via data inputting device 1010 or otherwise, into a suitable value representing the component of the dissipated electrical power. As indicated above, such an algorithm may be stored for reference in a data storage unit

1100. Alternatively, such an algorithm may be implemented by a hardware or firmware circuit in the system 1000.

A power measurement unit 1050 may be provided to measure the electrical power dissipated through an electrical power dissipating device 1110. It should be appreciated that during the calibration phase, the electrical power dissipated through the device 1110 may be successively adjusted by modifying a calibration factor based on the measurement such that at the conclusion of the calibration phase, a known amount of reference electrical power, may be dissipated through the device 1110 precisely. Based on numerous factors, including, for example, an inability to specifically know, with a required precision, the resistance of the resistive element, particularly as minor deviation to such resistance may occur over time, direct measurement of power dissipated through a resistive element may be difficult. As such, the systems and methods according to this disclosure may select one or another component of power, i.e., current through the resistive element or voltage across the resistive element, to be specifically set at a measured input. A relationship of a known input of a component of power, modified by a calibration factor, to a known reference value of the same, or another component of power may be used to set, or otherwise update, the calibration factor until a difference between a modified input component, as measured, and a known reference are resolved to be within a specified criterion.

As such, and in accordance with the above discussion, it should be appreciated that the data input via the data inputting device 1010 may be converted into a first component of power which may be subsequently modified by the value of the determined calibration factor to provide the adjusted first component of power through/across the electrical power dissipating device 1110. For an example, if the selected first component of power is electrical current, a data input via the data inputting device 1010 may be converted to a value of electrical current having a value dependent on the data input itself. Subsequently, that value of the electrical current may be modified by the value of the calibration factor and the value of the electrical current resulting from this operation may flow through the device 1110 dissipating electrical power.

In order to calibrate the electrical power dissipated through the device 1110 precisely, the electrical power dissipated through the device 1110 must be measured precisely. During a calibration phase, a known amount of reference electrical power may be dissipated through the device 1110 corresponding to a specific value of data input obtained via data inputting device 1010. To establish a precise relationship, a calibration factor is then turned to achieve the necessary relationship with respect to a reference value of at least one component of power. An initial value of the calibration factor may be set via a parameter setting unit 1030, and the tuning of the calibration factor may be accomplished via a parameter adjustment unit 1090. The parameter adjustment unit may comprise a closed loop feedback circuit.

Successive adjustment of the calibration factor may occur in the following manner. A component of power may be modified in a manner to attempt to match a corresponding reference value that is predetermined and/or pre-stored. The modification may be based on at least an initial value of the calibration factor. If the selected component of power is not resolved to fall within a predetermined criterion with reference to the predetermined reference value, an error signal representing a deviation falling outside the predetermined criterion may be estimated. The sign of the error signal may determine a direction in which the calibration factor should be modified. Such modification may be incremental according to a preset step factor. The direction in which the modification of the calibration factor is undertaken is intended to result in subsequent comparisons resulting in reduced values for the error signal until such predetermined criterion is met, thus resolving an established value for the calibration factor for subsequent operations. This process of modification of the calibration factor may occur through a closed feedback loop in which the error signal may determine a magnitude of the change in the correction factor.

Based on the modified value of the calibration factor, a newly obtained value of the selected component of power may be further compared to the corresponding reference value and if still not resolved to fall within a predetermined criterion, another value of the error signal may be estimated, this process continuing until the established value of the calibration factor is achieved. Once the predetermined criterion is satisfied, the established value of the calibration factor is obtained. At this point, the calibration phase may be suspended or terminated and the feedback loop may be operated.

It should be appreciated that one or more of the disclosed elements of the at least one of the data converter unit 1060, the sensor unit 1080, the power measurement unit 1050, comparison unit 1070 or the parameter adjustment unit 1090 may be implemented using CMOS-based circuits. In an exemplary embodiment During an execution of a specific calibration phase, the system 1000 may retrieve the value of the calibration factor that was established at the conclusion of the last calibration phase from, for example, a data storage unit 1100 where the value of the previous calibration factor may have been stored. Alternatively, the system 1000 may revert to a preset value of the initial calibration factor, or may receive an input of the initial calibration factor via, for example, a user interface 1020.

The comparison unit 1070 may compare the electrical power dissipated through the device 1110, based on measuring one or more components of the electrical power dissipated through the device 1110, with a known amount of a reference electrical power that may be represented by the same component of power or a different component of power. In either case, a known reference value may be stored within, or otherwise available to, the system 1000. The results of the comparison in the comparison unit 1010 may decide the manner by which the calibration factor should be modified such that the value of a resulting electrical power dissipated through the device 1110 may be adjusted incrementally closer to the value of the known reference electrical power until a substantial match is achieved thereby establishing a value for the calibration factor. The characteristics by which the comparison unit 1070 makes the comparison may be governed by a specific predefined criterion such that when this criterion is satisfied the electrical power dissipated through the device 1110 may be set precisely at the reference electrical power level, the calibration factor may be established, and the calibration phase may conclude. Satisfying the specific predefined criteria then establishes the calibration factor in such an instance.

It should be appreciated that, the comparison unit 1070 may be implemented in a variety of ways. Electrical voltage across, or electrical current through, the electrical power dissipating device 1110 are the components of the dissipated electrical power through the device 1110 that may be susceptible to measuring by the power measurement unit 1050. It should be appreciated that the comparison of the value of the electrical power dissipated through a device 1110 may be performed directly with a reference value of electrical power. It may be further appreciated that the comparison of the value of the electrical power with a reference value of electrical power may be performed indirectly by comparing the value of any of the components of electrical power dissipated through the device 1110 with a corresponding reference value associated with any component of the electrical power.

The parameter adjustment unit 1090 may adjust the value of a calibration factor during the calibration phase. The initial value of the calibration factor, at the commencement of the calibration phase, may be obtained through the parameter setting unit 1030, as discussed above. During the execution of a calibration phase, the parameter adjustment unit 1090 may successively modify the calibration factor until a specific predefined criterion is satisfied. An objective of the predefined criterion may be to have an appropriate value of the calibration factor established at the conclusion of the calibration phase, such that for the established value of the calibration factor, the electrical power dissipated through an electrical power dissipating device 1110 may be precisely set for each value of data input. At the conclusion of the calibration phase, a value of the calibration factor may be established by the parameter adjustment unit 1090 that may then be retained until the next calibration phase either within the parameter adjustment unit 1090, stored as data in, for example, a data storage unit 1100, or otherwise held. In an electrical power dissipation setting phase that may be executed subsequent to the calibration phase, the calibration factor may be applied at the established value until a next calibration phase is initiated, executed and concluded.

Measuring the electrical power dissipated through the device 1110 by the power measuring unit 1050 and subsequent comparison of the measured value to a known reference value of electrical power in the comparison unit 1070 may have to be repeatedly performed until the electrical power dissipated through the device 1110 is precisely set at the reference electrical power value to be calibrated and the calibration factor is established.

Figure 2:
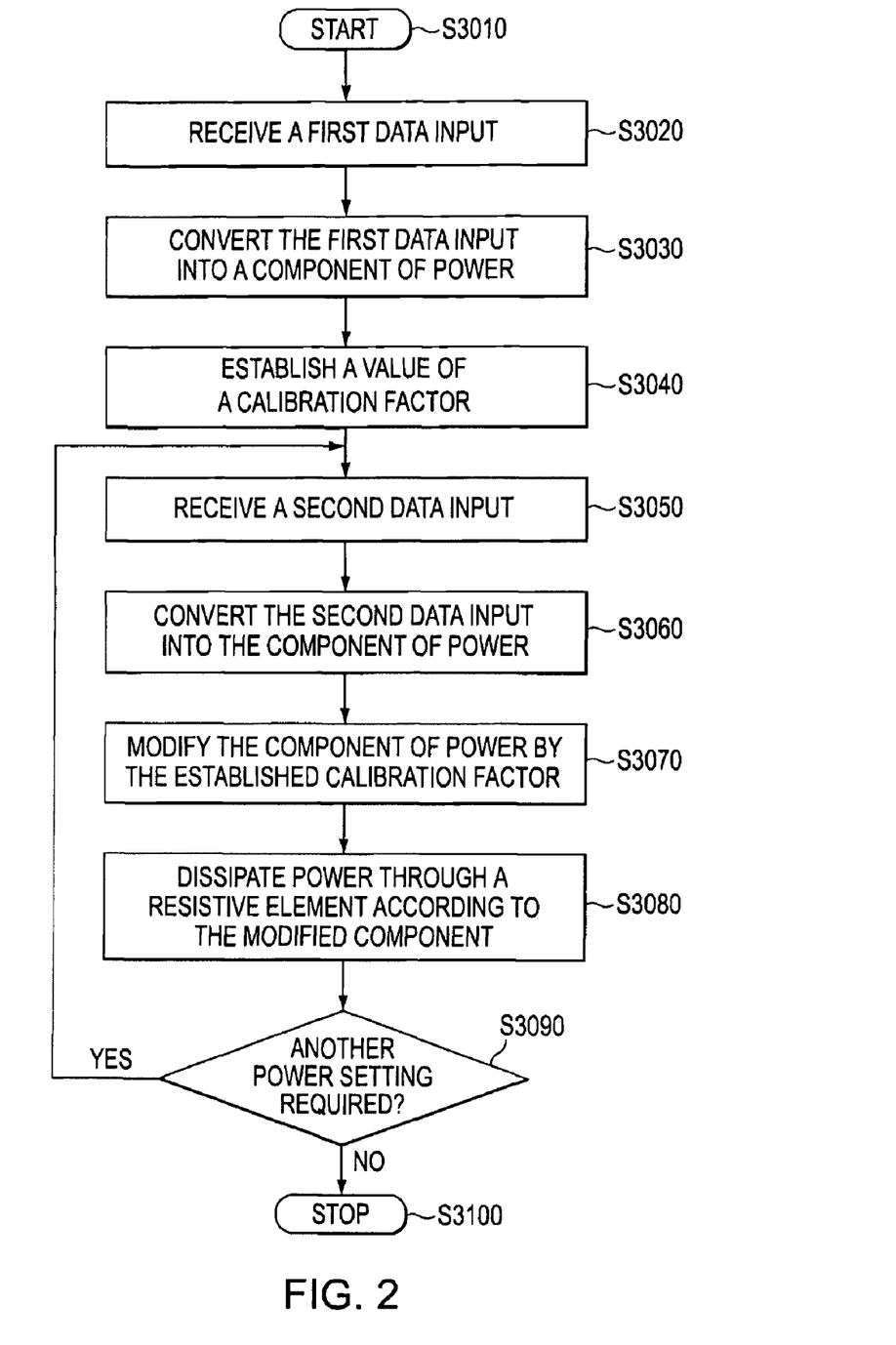
FIG. 2 is a flow diagram depicting an exemplary method for dissipating a predetermined amount of electrical power precisely through an electrical power dissipating device.

FIG. 2 is a flow diagram depicting an exemplary method for dissipating a predetermined amount of electrical power precisely through a device that may include a resistive element. As shown in FIG. 2, operation of the method begins at step S3010 and proceeds to step S3020.

In step S3020, a first data input is received which may be in an analog or digital form. The first data input represents data associated with a known power to be dissipated through the device. Operation of the method continues to step S3030.

In step S3030, the first data input is converted into a component of electrical power. Such a component may include one or more of an electrical current through the device or an electrical voltage across the device. Such conversion may occur through execution of a conversion algorithm, as discussed above. Such a conversion algorithm may be stored in a data storage device or otherwise available in a system for executing the method. Operation of the method continues to step S3040.

In step S3040, a routine may be performed in which a value of a calibration factor may be established such that an ultimately established value of the calibration factor may be applied to the received first input in order that a known value of reference electrical power is precisely adjusted to be dissipated through the device. The details of an exemplary routine relating to step S3040 are illustrated in the flow diagram of FIG. 3. Operation of the method continues to step S3050.

In step S3050, a second data input is received which may be in analog or digital form. The second data input represents data that relates to an amount of power to be precisely adjusted in order that, for example, a thermal expansion of a device through which the power is dissipated is controlled to one or more beneficial purposes. Such beneficial purposes may include, for example, adjusting a specific separation distance between, for example, a read/write sensing head and a data storage medium in, for example, a fly-high controller. The data may be received, for example, via a user interface. Operation of the method continues to step S3060.

In step S3060, the second data input is converted into a component of dissipated electrical power. Although the conversion from the second data may be to any component of electrical power, such as, for example, an electrical current through, or an electrical voltage across, the device, the conversion from the second data input may correspond with the same component as the first data input conversion. The data conversion may be undertaken by executing the same algorithm as in step S3030 above. Operation of the method continues to step S3070.

In step S3070, the value of the component of electrical power obtained through the step S3060 is modified by the established value of the calibration factor. Operation of the method continues to step S3080.

In step S3080, the resultant modified value of the component of electrical power is applied to the device dissipating an electrical power in such a manner that the thermal expansion occurring in the device based on heat generated by the power dissipation is precisely controlled. Operation of the method continues to step S3090.

In step S3090, a determination is made whether another value of electrical power is required to be set to be dissipated through the electrical power dissipating device.

If, in step S3090, a determination is made that another value of electrical power is required to be set to be dissipated through the electrical power dissipating device, operation of the method reverts to step S3050 where another value of a second data input may be received.

Figure 3:
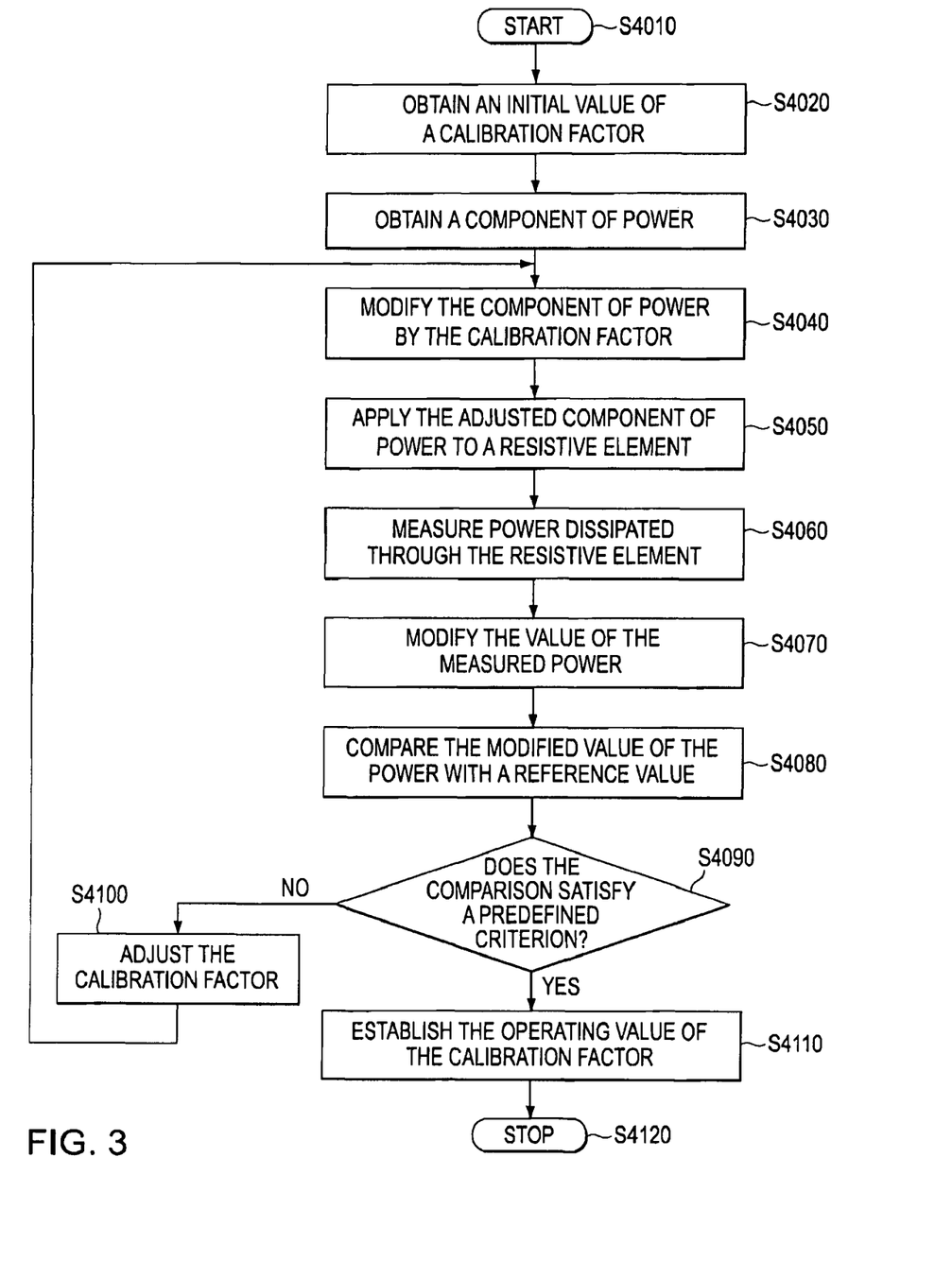
FIG. 3 is a flow diagram depicting an exemplary method for calibrating a known amount of reference electrical power precisely through a device.

If, in step S3090, a determination is made that no other value of electrical power is required to be set to be dissipated through the electrical power dissipating device, operation of the method continues to step S3100 where operation of the method ceases FIG. 3 is a flow diagram depicting an exemplary method for calibrating a known amount of reference electrical power precisely through a device. As shown in FIG. 3, operation of the method commences at step S4010 and proceeds to step S4020.

In step S4020, an initial value of a calibration factor is obtained. As is discussed in detail above, such initial value of a calibration factor may be obtained by several different means. These means include, but are not limited to, for example, retrieving as the initial value of the calibration factor to be used in a current calibration phase, an established value for the calibration factor that was established at the conclusion of the last calibration phase, or receiving a new initial value of the calibration factor through other means such as, for example, as a preset value stored in a data storage unit received or from a user input via some manner of user interface. Operation of the method continues to step S4030.

In step S4030, a data input is received and converted into a component of electrical power. The electrical power dissipated through a device includes components, principally electrical current through the device and an electrical voltage across the device. Conversion algorithms to convert known input data to at least one component of power intended to be dissipated through the device are as discussed above. Operation of the method continues to step S4040.

In step S4040, the value of the component of electrical power is modified by the current value of the calibration factor. Operation of the method continues to step S4050.

In step S4050, the modified component of electrical power is applied to the electrical power dissipating device, the dissipating device including at least one resistive element. Operation of the method continues to step S4060.

In step S4060, the electrical power dissipated through the device is measured. The device here may be a resistive element that represents a sensing head of a hard disk driver system. It should be recognized that a direct measurement of electrical power dissipated through the device may be impractical based on a number of factors. As such, direct measurement of a component of power regarding, e.g., electrical current through or electrical voltage across, the device may be undertaken. In such an instance, the component of the electrical power dissipated through the device is sensed. The component sensed may be the component of electrical power dissipated that was obtained in the first place from the data input or another component. For example, regardless that electrical current was the component of electrical power that was obtained from the data input, either an electrical current or an electrical voltage as a measure of electrical power dissipated through the device may be sensed. Operation of the method continues to step S4070.

In step S4070, the second component of measured electrical power dissipated through the device is modified by a current value of the calibration factor. Operation of the method continues to step S4080.

In step S4080, the modified measurement of electrical power dissipated through the device, i.e., the modified component of the electrical power is compared to an appropriate reference value. The reference value will correspond to the sensed component value as modified by the current value of the calibration factor. Operation of the method continues to step S4090.

In step S4090, a determination is made whether the comparison satisfies a predefined criterion. The predefined criterion is intended to provide a tolerance within which the measure of power may fall with reference to the known value in order that the values need not be precisely equivalent.

If in step S4090, a determination is made that the comparison does not satisfy the predefined criterion, operation of the method continues to step S4100.

In step S4100, the calibration factor is modified in a manner such that the value of the resulting electrical power dissipated through the device may be incrementally moved in a direction closer to the value of the reference electrical power. Operation of the method then reverts to step S4040 where the adjusted value of the calibration factor is used to modify the component of power.

If in step S4090, a determination is made that the comparison satisfies the predetermined criterion, operation of the method continues to step S4110.

In step S4110, the current (or last) value of calibration factor, i.e., the value of the calibration factor when the comparison satisfies the predetermined criterion, is established as the value of the calibration factor for the current operating phase of the device. Operation of the method continues to step S4120 where operation of the method ceases.

It should be appreciated that, given the required inputs, software algorithms, hardware/firmware circuits, or any combination of software, hardware and/or firmware control elements may be used to implement the individual devices and/or units in the exemplary embodiment of a system for dissipating a predetermined amount of electrical power precisely through an electrical power dissipating device.

Any of the data storage units depicted, or alternatively described above, may be implemented using an appropriate combination of alterable, volatile or non-volatile memory, or non-alterable, or fixed, memory. The alterable memory, whether volatile or non-volatile, may be implemented using any one or more of static or dynamic RAM, or for example, any computer-readable disk type media and compatible disk drive, a hard drive, a flash memory, or any other like memory medium and/or device. Similarly, the non-alterable or fixed memory may be implemented using any one or more ROM, PROM, EPROM, EEPROM, optical ROM disk, such as, for example, CD-ROM or DVD-ROM disk and compatible disk drive, or any other like memory storage medium and/or device.

The computations may be performed with integrated circuit elements, and ASIC or other integrated circuit, a hardwired electronic or logic circuit such as a discrete element circuit, a programmable logic device such as a PLD, PLA, FGPA or PAL or the like.

While this proposal has been described with specific embodiments thereof, it is evident that many alternatives, modifications and variations will be apparent to those skilled in the art. Accordingly, the preferred embodiments of this invention as set forth herein are intended to be illustrative, not limiting.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims. These and other features and advantages of this proposal are described or are apparent from the above detailed description of the preferred embodiments. Various changes may be made without departing from the spirit and scope of this invention as defined in the following claims.

What is claimed is:

1. A method for controlling a thermal expansion of a power dissipating device based on heat generated by power dissipation, comprising:

during a calibration step:
receiving a first data input value representing a known amount of a reference electrical power to be dissipated by the power dissipating device prior to device operation;
executing an algorithm to convert the first data input value into a component of the reference electrical power in order to establish a mathematical relationship between the first data input value and an amount of electrical power dissipated by the power dissipating device;
adjusting the amount of electrical power dissipated by the power dissipating device to determine a calibration factor that modifies the component of the reference electrical power to establish an operating calibration factor for the power dissipating device;

during a power control step:
receiving a second data input value that represents a determined electrical power to be dissipated by the power dissipating device in operation;
executing an algorithm to convert the second data input value into a component of the determined electrical power to be dissipated by the power dissipating device in operation;
adjusting the component of the determined electrical power by the established operating calibration factor; and
setting the operating electrical power of the device according to the adjusted component of the determined electrical power.

2. The method of claim 1, wherein the calibration step is performed only once during a power-up cycle.

3. The method of claim 1, wherein the setting is performed a plurality of times for different values of the second data input value.

4. The method of claim 1, the step of adjusting during the calibration step comprising:
  obtaining an initial value of the calibration factor;
  modifying the component of the reference electrical power by the initial value of the calibration factor;
  applying the modified component of the reference electrical power to the power dissipating device;
  measuring an amount of electrical power dissipated by the power dissipating device;
  comparing the amount of electrical power dissipated by the power dissipating device with the reference electrical power; and
  adjusting the calibration factor to establish the operating calibration factor for the power dissipating device based on the comparison.

5. The method of claim 4, wherein the adjusting is undertaken when the comparison fails to satisfy a pre-defined criterion.

6. The method of claim 5, wherein the adjusting occurs successively through a feedback loop until the comparison satisfies the pre-defined criterion.

7. The method of claim 6, wherein the adjusting further comprises:
  evaluating whether the comparison fails to satisfy the pre-defined criterion;
  determining a sign of a change in the calibration factor to reduce a difference in the comparison; and
  adjusting the initial value of the calibration factor by applying a predetermined incremental value with the determined sign to establish an interim value of the calibration factor,
  wherein the component of the electrical power is modified based on the interim value of the calibration factor.

8. The method of claim 7, further comprising repeating the modifying, measuring, comparing and adjusting until the comparing satisfies the pre-defined criterion, a last value interim value of the calibration factor being set as the established value of the calibration factor for the power dissipating device in operation.

9. The method of claim 8, wherein, when the established value of the calibration factor is set, the feedback loop is disabled completing the calibrating.

10. The method of claim 4, wherein the measuring the amount of electrical power dissipated by the power dissipating device comprises sensing a component of the electrical power being dissipated by the power dissipating device, and
  the comparing compares the sensed component of electrical power being dissipated by the power dissipating device with a reference value for that component of power.

11. The method of claim 1, further comprising storing the established operating calibration factor in a storage device,
  wherein, on a next power-up cycle, the stored established operating calibration factor is obtained as an initial value of the calibration factor.

12. The method of claim 1, wherein the power dissipated by the power dissipating device in operation is set to control a thermal expansion of the power dissipating device based on heat generated by the power dissipation.

13. The method of claim 1, wherein the power dissipating device is a read/write sensing head and the power dissipated by the power dissipating device in operation is set to control a separation distance between the read/write sensing head and a data storage medium with which the read/write sensing head cooperates.

14. The method of claim 1, wherein the method is executed by a fly high controller in a read/write system.

15. A system for controlling a thermal expansion of a power dissipating device based on heat generated by the power dissipation, comprising:
  the power dissipating device;
  a data inputting device for inputting a data input value representing a known amount of a reference electrical power to be dissipated by the power dissipating device;
  a calibration device that determines a calibration factor to adjust a component of power;
  a data converter that converts the data input value into the component of power and that modifies the component of power by the calibration factor before the component of power is applied to the power dissipating device;
  a sensor unit that senses a component of power dissipated by the power dissipating device;
  a power measurement unit that measure the power dissipated by the power dissipating device according to the sensed component;
  a comparison unit that compares the measured power dissipated by the power dissipating device with a reference power value to determine whether a difference satisfies a pre-defined criterion; and
  a parameter adjustment unit that adjusts the calibration factor based on the comparison to further modify the component of power until the comparison of the measured power dissipated by the power dissipating device and the reference power value satisfies the pre-defined criterion to establish a value of the calibration factor for operation of the power dissipating device.

16. The system of claim 15, wherein a Complementary Metal Oxide Semiconductor (CMOS) circuit implements at least one of the data converter, the sensor unit, the power measurement unit, comparison unit or the parameter adjustment unit.

17. The system of claim 15, wherein the data converter converts the data input value into a component of power, the component of power being at least one of an electrical current through the power dissipating device or an electrical voltage across the power dissipating device, by executing a power converting algorithm.

18. The system of claim 17, wherein, when the component of power is an electrical current through the power dissipating device, the data converter further comprises a semiconductor current mirror.

19. The system of claim 17, wherein, when the component of power is an electrical voltage across the power dissipating device, the data converter unit further comprises a voltage gain amplifier.

20. The system of claim 15, wherein the parameter adjustment unit adjusts the calibration factor by determining a sign of a change in the calibration factor to reduce a difference in the comparison between the measured power dissipated by the power dissipating device and the reference power value, and applying a predetermined incremental value with the determined sign to a current value of the calibration factor to establish a next value of the calibration factor to be applied by the data converter.

21. The system of claim 15, wherein the comparison unit compares the sensed component of power with a reference value for that sensed component.

22. The system of claim 15, wherein the error signal generating unit computes an error between the sensed component of power and the corresponding reference value.

23. The system of claim 15, wherein the power dissipating device in operation is subject to thermal expansion based on heat generated by the power dissipation, and the established value of the calibration factor for operation of the power dissipating device is applied to a component of power based on a data input value to control the thermal expansion of the power dissipating device.

24. The system of claim 15, wherein the power dissipating device is a read/write sensing head and the power dissipated by the power dissipating device in operation is set to control a separation distance between the read/write sensing head and a data storage medium with which the read/write sensing head cooperates.

25. A fly high controller in a read/write system including a circuit component that is configured to adjust electrical power dissipated by a power dissipating device of the fly high controller, the circuit component comprising:

a data inputting device for inputting a data input value representing a known amount of a reference electrical power to be dissipated by the power dissipating device;

a calibration device that determines a calibration factor to adjust a component of power;

a data converter that converts the data input value into the component of power and that modifies the component of power by the calibration factor before the component of power is applied to the power dissipating device;

a sensor unit that senses a component of power dissipated by the power dissipating device;

a power measurement unit that measure the power dissipated by the power dissipating device according to the sensed component;

a comparison unit that compares the measured power dissipated by the power dissipating device with a reference power value to determine whether a difference satisfies a pre-defined criterion; and a parameter adjustment unit that adjusts the calibration factor based on the comparison to further modify the component of power until the comparison of the measured power dissipated by the power dissipating device and the reference power value satisfies the pre-defined criterion to establish a value of the calibration factor for operation of the power dissipating device.

* * * * *